US007283924B2

(12) United States Patent  
Lauer et al.

(10) Patent No.: US 7,283,924 B2
(45) Date of Patent: Oct. 16, 2007

(54) METHOD FOR AUTOMATICALLY DETERMINING THE FITTING POSITIONS OF TIRES IN A MOTOR VEHICLE

(75) Inventors: Peter Lauer, Karben (DE); Stefan Stölzl, Weinheim (DE); Martin Griesser, Eschborn (DE); Andreas Köbe, Bensheim (DE); Frank Edling, Chiba (JP); Peter Säger, Friedrichsdorf (DE); Vladimir Koukes, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/539,669

(22) PCT Filed: Nov. 28, 2003

(86) PCT No.: PCT/EP03/13451

§ 371 (c)(1),
(2), (4) Date: Apr. 18, 2006

(87) PCT Pub. No.: WO2004/058517

PCT Pub. Date: Jul. 15, 2004

(65) Prior Publication Data

US 2006/0235645 A1    Oct. 19, 2006

(30) Foreign Application Priority Data

Dec. 20, 2002 (DE) ................................ 102 59 944

(51) Int. Cl.
*G06F 15/00* (2006.01)
(52) U.S. Cl. ................ 702/147; 702/138; 702/152; 340/442; 340/444; 340/445; 340/438; 340/447; 73/146.5
(58) Field of Classification Search ................ 702/147, 702/138, 152; 340/438, 442, 444, 445, 447; 73/146, 146.2, 146.3, 146.5
See application file for complete search history.

(56) References Cited

U.S. PATENT DOCUMENTS

| 6,014,599 | A | * | 1/2000 | Inoue et al. ................... 701/29 |
| 6,446,023 | B1 | * | 9/2002 | Ernst ........................... 702/138 |
| 6,731,205 | B2 | * | 5/2004 | Schofield et al. ........... 340/444 |
| 6,802,213 | B1 | * | 10/2004 | Agrotis ......................... 73/146 |
| 2002/0130771 | A1 | * | 9/2002 | Osborne et al. ............ 340/438 |
| 2004/0178897 | A1 | * | 9/2004 | Fennel et al. ............... 340/442 |
| 2005/0044946 | A1 | * | 3/2005 | Agrotis ...................... 73/146.5 |
| 2005/0253696 | A1 | * | 11/2005 | Mori et al. .................. 340/445 |

FOREIGN PATENT DOCUMENTS

| DE | 4205911 | 9/1993 |
| DE | 19618658 | 11/1997 |
| DE | 19618659 | 11/1997 |
| DE | 19721480 | 11/1998 |
| DE | 19849390 | 5/2000 |
| DE | 19921413 | 11/2000 |
| DE | 10058099 | 5/2002 |
| DE | 10060392 | 6/2002 |
| DE | 10105641 | 8/2002 |
| DE | 10152590 | 10/2002 |

* cited by examiner

Primary Examiner—Carol S. W. Tsai

(57) ABSTRACT

The present device relates to a method for automatically determining the installation positions of wheels in a motor vehicle. The motor vehicle has a direct measure tire pressure monitoring system includes individual wheel tire pressure measuring devices and transmitting devices for the transfer of TPMS data containing tire air pressure values and identification numbers of the individual wheels to a receiving and evaluating device installed in or on the vehicle. The motor vehicle also includes an indirect measuring tire pressure monitoring system determining DDS data containing air pressure changes and installation positions from the rotational behavior of the individual wheels. The method includes determining correlation coefficients from the TPMS data and the DDS data by using a correlation function.

7 Claims, No Drawings

METHOD FOR AUTOMATICALLY DETERMINING THE FITTING POSITIONS OF TIRES IN A MOTOR VEHICLE

BACKGROUND OF THE INVENTION

The present invention relates to a method for the automatic determination of the installation positions of wheels in a motor vehicle.

DE 42 05 911 A1 discloses a monitoring device for the air pressure of tires of vehicle wheels. However, the realization presented therein is very sophisticated. An embodiment mentioned therein includes an associated receiver on the vehicle for each transmitter in the wheel, while another embodiment is based on a combined transmitting/receiving unit in the wheel and one or more receiving units on the vehicle. The individual wheels are allocated to their installation positions by way of a so-called pairing process, which is carried out either manually or automatically. In the manual pairing process, an operator allocates the wheels to their installation positions. Therefore, the manual pairing process is very time-consuming and labor-intensive and, in the event of a faulty operation, can cause a wrong allocation of the individual wheels to their installation positions. The automatic pairing process renders a correct allocation of the individual wheels to the installation positions possible. However, the technical effort needed is very comprehensive and costly as it necessitates additional hardware, e.g. several receiving antennas.

DE 197 21 480 A1 discloses a method for detecting pressure loss in the vehicle tire. As the method is based on signals being obtained from rotational wheel speeds of several vehicle wheels, it is possible to allocate the wheel with air pressure loss to the respective, actually existing mounting position. However, the method is inappropriate to determine an absolute pressure value of the individual wheels.

SUMMARY OF THE INVENTION

In view of the above, an object of the invention involves providing a low-cost method, which furnishes data about absolute air pressure values and the mounting positions.

This object is achieved by means of the method for the automatic determination of the installation position of wheels in a motor vehicle. The method includes receiving tire pressure monitoring system data (TPMS) from a direct measure tire pressure monitoring system, receiving deflation detection data from an indirect tire pressure monitoring system and determining correlation coefficients from the TPMS data and the deflation data by means of a correlation function.

The correlation coefficients are preferably determined from first allocation functions and second allocation function by using a correlation function.

The first allocation functions are preferably produced from the TPMS data describing all possible allocations of the identification numbers to the installation positions, and an individual characteristic value is allocated to each possible allocation. Further, in the preferred embodiment described herein, the second allocation functions are produced from the DDS data assigning in each case another individual characteristic value to each possible installation position of a wheel. Preferably, the first allocation functions are composed of 24 functions F_dmR_j_i (j describes an integral index which can assume values between 1 and 24; i describes a consecutive index), which describe all possible allocations of the identification numbers to the installation positions in a four-wheel vehicle. In a furthermore preferred manner, the second allocation functions in a four-wheel vehicle are composed of four functions F_imR_i (i describes another consecutive index), which describe the possible installation positions (left front, right front, left rear, right rear).

In another preferred embodiment of the current method, the correlation function comprises an averaging operation as a function of time.

Preferably, the correlation function is obtained from a quotient, from a dividend essentially composed of a multiplication of the first allocation functions with the second allocation functions, and a divisor essentially composed of a multiplication of the squared first allocation functions with the squared second allocation functions.

In another preferred embodiment, the correlation coefficients represent numerical values describing probabilities, whether the selected allocation of the identification numbers to the installation positions is coincident with the actual allocation, while the time averaging operation causes a standardization of the numerical values to a range of values, in particular to a range between −1 and +1.

Advantageously, all calculated correlation coefficients are compared with each other, and the correlation coefficient with the maximum absolute numerical value irrespective of sign represents the correct allocation of the wheels to the installation positions. Subsequently, the identification numbers are allocated to the installation positions according to the determined allocation.

DETAILED DESCRIPTION OF THE EMBODIMENTS

Further preferred embodiments can be taken the following description of an embodiment.

The method is based on a direct measuring tire pressure monitoring system (TPMS; Tire Pressure Monitoring System) with four transmitting wheel pressure modules and a receiving and evaluating device. In this system each wheel is equipped with a tire pressure measuring device including a transmitting device which transmits TPMS data to the receiving and evaluating device, said data being composed for each wheel of a wheel-related identification number and the air pressure pertaining to this wheel. Since the directly measuring tire pressure monitoring system described above, without a pairing process described hereinabove or any other allocation process, is not in a position to realize an allocation of the wheels to their installation positions merely by way of the identification numbers, further information is required that allows allocating the wheels to their installation positions. This additional information, hereinbelow referred to as DDS data, is obtained from an indirectly measuring tire pressure monitoring system (DDS; Deflation Detection System), which determines changes in the air pressure from the rotational behavior of the individual wheels and is therefore appropriate to determine the installation position of a wheel exhibiting pressure loss. The directly measuring tire pressure monitoring system transmits the TPMS data to the receiving and evaluating device. The indirectly measuring tire pressure monitoring system preferably produces reference values being indicative of tire pressure loss. The TPMS data is changing during driving, more or less constantly, e.g. due to the influence of temperature. DDS data is also influenced during driving due to numerous disturbing effects such as changing rolling circumferences of the wheel on account of wheel load variations, changes in the coefficient of friction, load variations, etc. The method of the invention is based on the fact that in a case of control the tire pressure changes of the TPMS data correlate with the changes of the DDS data.

According to the method of the invention, two allocation functions F_imR (imR refers to the indirect measuring tire pressure monitoring system) and F_dmR (dmR refers to the direct measuring tire pressure measuring system), which allow an allocation of the wheels to the installation positions by means of a correlation method and an evaluating method.

The function F_imR_i (i refers to a consecutive index) assigns a value to a wheel. As this occurs, F_imR_i=1, if wheel VR (right front) is faster,
F_imR_i=2, if wheel VL (left front) is faster,
F_imR_i=3, if wheel HL (left rear) is faster,
F_imR_i=4, if wheel HR (right rear) is faster.

In this arrangement VR means right front, VL means left front, HL means left rear, and HR means right rear.

Since the direct measuring tire pressure monitoring system transmits only an information about the absolute tire air pressure and the associated identification number ID_x (x refers to an integral index from 1 to 4), all possible combinations between the installation positions (VR, VL, HR, HL) and the identification numbers (ID_1, ID_2, ID_3, ID_4) must be tested. 24 different combinations result in a four-wheel vehicle. These 24 functions F_dmR_j_i (j describes an integral index that can adopt values between 1 and 24; i describes a consecutive index) are calculated in the following. The first function F_dmR_1_i e.g. corresponds to the possible allocation:

VR=ID_1, VL=ID_2, HL=ID_3, HR=ID_4.

From this results the following allocation of values for the function F_dmR_1_i:

F_dmR_1_i=1, if the wheel with ID_1 has the higher rate of pressure reduction,
F_dmR_1_i=2, if the wheel with ID_2 has the higher rate of pressure reduction,
F_dmR_1_i=3, if the wheel with ID_3 has the higher rate of pressure reduction, and
F_dmR_1_i=4, if the wheel with ID_4 has the higher rate of pressure reduction.

The second function F_dmR_2_i e.g. corresponds to the possible allocation VR=ID_2, VL=ID_3, HL=ID_4, HR=ID_1.

The following allocation of values results from this for the function F_dmR_2_i:

F_dmR_2_i=1, if the wheel with ID_2 has the higher rate of pressure reduction,
F_dmR_2_i=2, if the wheel with ID_3 has the higher rate of pressure reduction,
F_dmR_2_i=3, if the wheel with ID_4 has the higher rate of pressure reduction, and
F_dmR_2_i=4, if the wheel with ID_1 has the higher rate of pressure reduction.

Corresponding values are allocated to the functions F_dmR_3_i to F_dmR_24_i.

The 24 correlation coefficients Korr_j (j describes an integral index, which can adopt values between 1 und 24) are determined according to the equation $$Korr\_j = \frac{\sum_{i=1}^{N}[(F\_imR\_i)\cdot(F\_dmR\_j\_i)] - \frac{1}{N}\cdot\sum_{i=1}^{N}(F\_imR\_i)\cdot\sum_{i=1}^{N}(F\_dmR\_j\_i)}{\left\{\left[\left(\sum_{i=1}^{N}(F\_imR\_i)^2\right)-\frac{1}{N}\cdot\left(\sum_{i=1}^{N}F\_imR\_i\right)^2\right]\cdot\left[\left(\sum_{i=1}^{N}(F\_dmR\_j\_i)^2\right)-\frac{1}{N}\cdot\left(\sum_{i=1}^{N}F\_dmR\_j\_i\right)^2\right]\right\}^{0,5}}$$

N indicates the number of measurements.

The correlation coefficients Korr_j are in the range $-1 \leq Korr\_j \leq +1$. The function F_dmR_j_i, having a correlation coefficient Korr_j whose absolute value irrespective of sign is considerably higher than all other correlation coefficients Korr_j, describes with a high rate of probability the correct allocation of the identification numbers (ID_1, ID_2, ID_3, ID_4) to their installation positions (VL, VR, HL, HR).

The allocation of the function F_dmR_1_i with VR=ID_1, VL=ID_2, HL=ID_3, HR=ID_4 e.g. describes the correct allocation. This means that the correlation coefficient Korr_1 has a considerably higher absolute value irrespective of sign than the other calculated correlation coefficients.

The invention claimed is:

1. A method for automatically determining installation positions of wheels in a motor vehicle, the method comprising:
   receiving tire pressure monitoring system data (TPMS) from a direct measure tire pressure monitoring system, wherein the direct measure tire pressure monitoring system having tire pressure measuring devices and transmitting devices for transferring the TPMS date containing tire pressure values and identification numbers of individual wheels;
   receiving deflation detection data from an indirect measuring tire pressure monitoring system determining deflation detection data from rotational behavior of the individual wheels, said deflation data containing pressure changes and installation positions; and
   determining correlation coefficients from the TPMS data and the deflation data by means of a correlation function.

2. The method of claim 1, wherein the correlation coefficients are determined from first allocation functions and second allocation functions by using the correlation function.

3. The method of claim 2, wherein the first allocation functions describe all possible allocations of the identification numbers to installation positions are produced from the TPMS data, and an individual characteristic value is allocated to each possible allocation, and in that the second allocation functions are produced from the deflation detection data and assigned in each case another individual characteristic value to each possible installation position of a wheel.

4. The method of claim 1, wherein the correlation function comprises an averaging operation as a function of time.

5. The method of claim 2, wherein the correlation function is obtained from a quotient, from a dividend essentially composed of a multiplication of the first allocation functions with the second allocation functions, and a divisor essentially composed of a multiplication of the squared first allocation functions with the squared second allocation functions.

6. The method of claim 2, wherein the correlation coefficients represent numerical values describing probabilities, whether the selected allocation of the identification numbers to the installation positions is coincident with the actual allocation, while the time averaging operation causes a standardization of the numerical values to a range of values, in particular to a range between and −1 and +1.

7. The method of claim 6, wherein all of the calculated correlation coefficients are compared with each other, and the correlation coefficient with the maximum absolute numerical value irrespective of sign represents the correct allocation of the wheels to the installation positions, and in that the identification numbers are allocated to the installation positions according to the determined allocation.

* * * * *